Patented Feb. 15, 1944

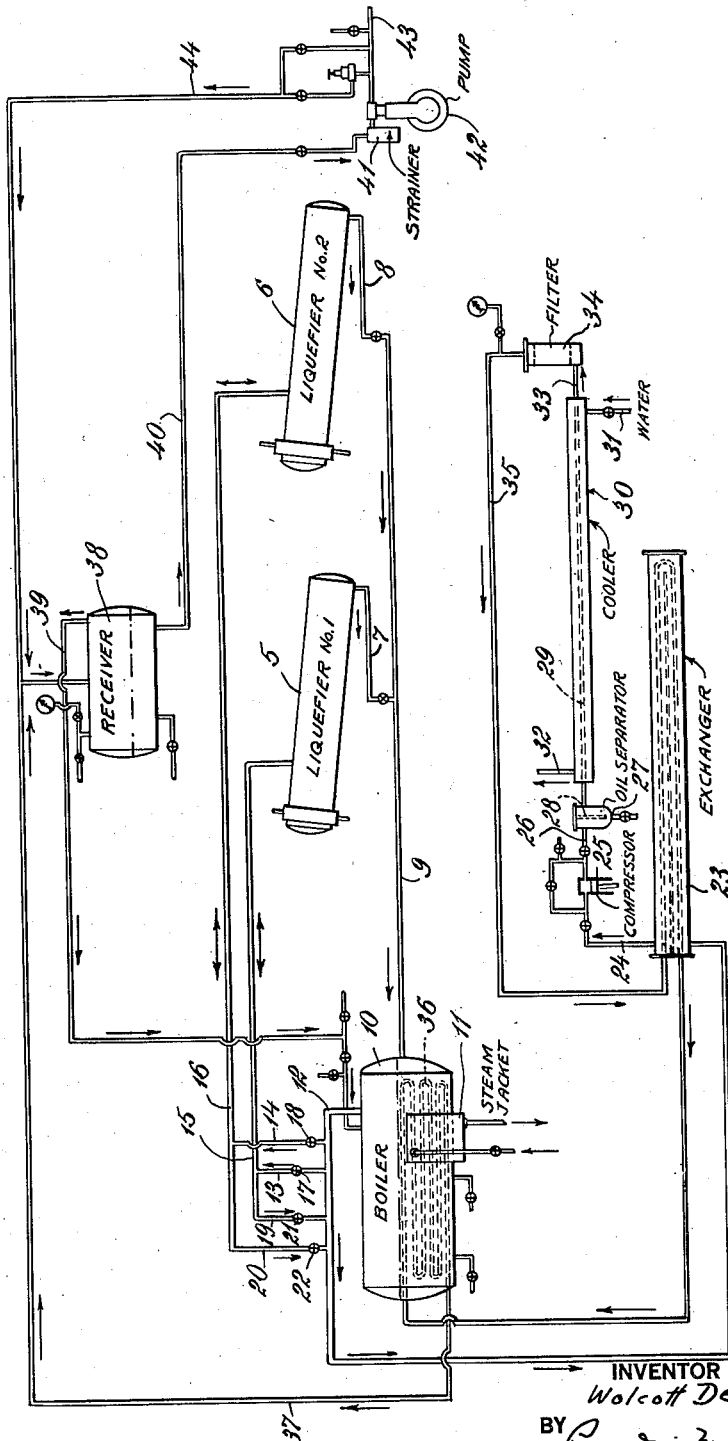

2,341,697

UNITED STATES PATENT OFFICE 2,341,697

PRODUCTION OF LIQUID CARBON DIOXIDE

Wolcott Dennis, Stamford, Conn., assignor to Air Reduction Company, Incorporated, New York, N. Y., a corporation of New York Application October 29, 1941, Serial No. 417,004

15 Claims. (Cl. 62—170)

This invention relates to the production of liquid carbon dioxide and particularly to the conversion of solid carbon dioxide to the liquid phase.

Liquid carbon dioxide has been produced and marketed in cylinders under pressure for many years, and has been utilized for many industrial purposes, including for example carbonation of beverages. In recent years, owing to the large industrial production of solid carbon dioxide, much of this material has been utilized by conversion to the liquid phase. A simple method of conversion consists in permitting the solid carbon dioxide to liquefy in a suitable container from which the liquid is withdrawn and delivered, at the high pressure developed within the container, to the cylinder in which it is transported. In another method, the solid carbon dioxide is liquefied and then permitted to vaporize, the vapor being withdrawn at high pressure and condensed by indirect thermal contact with cooling water. The liquid thus produced is then delivered, at the high pressure developed, to the cylinders. In these methods, it is essential that pressures in excess of 1000 pounds per square inch be developed and maintained in the liquefiers. This necessitates liquefiers of strong construction, capable of withstanding the pressures developed therein.

A further and more important difficulty with earlier methods results from the fact that oil is used as a plasticizer in the manufacture of solid carbon dioxide. The oil which is retained in the solid carbon dioxide enters the liquefier and inevitably contaminates the liquid product. When such liquid is utilized for industrial purposes, and especially in the carbonation of beverages, the oil, even in the small proportions present, imparts an unsatisfactory taste and odor to the beverage or other material treated, and not infrequently spoils the material so that it cannot be disposed of in commerce.

It is the object of the present invention to avoid the difficulties mentioned and especially to simplify and easily eliminate substantially all of the oil which may be present from the liquid product.

Another object of the invention is the provision of a method and apparatus permitting large scale conversion of solid carbon dioxide into liquid carbon dioxide which is substantially free from oil impurities.

Another object of the invention is the provision of a method and apparatus for converting solid carbon dioxide into liquid carbon dioxide which is more economical in operation and ensures a better product than has been available as the result of methods heretofore in use.

Other objects and advantages of the invention will be apparent as it is better understood by reference to the following specification and accompanying drawing, which diagrammatically illustrates an apparatus suitable for the practice of the invention.

I have discovered that it is possible to filter substantially all of the oil which may be carried over from the liquefier by the gaseous carbon dioxide released as vapor therein, provided the filtration is accomplished at pressures below 300 pounds per square inch gauge, and preferably in the neighborhood of 150 pounds per square inch gauge. Moreover, if the liquefiers are operated at relatively low pressures above the triple point pressure, for example from 60 to 150 pounds per square inch gauge, most of the oil introduced with the solid carbon dioxide remains in the liquefier or in the boiler in which the liquid is vaporized because of the relatively low temperature of the liquid at the lower pressures. The oil can be removed from the liquefier or boiler from time to time, as may be necessary. Furthermore, the maintenance of low pressures in the liquefiers and in the boiler permits the use of receptacles capable of holding a ton or more of solid carbon dioxide without unduly increasing the weight of the liquefier or boiler in order to afford the strength required to permit maintenance of high pressures.

In carrying out the invention, I prefer to employ a boiler which is supplied with liquid carbon dioxide by melting solid carbon dioxide in one or more liquefiers. Preferably two liquefiers are employed, so that they may be charged alternately, but additional liquefiers may be used to maintain a supply of liquid sufficient to meet the liquid requirements of a boiler of given capacity. Steam or any other suitable medium is supplied as a heating agent to vaporize the liquid in the boiler, and a portion of the vapor is returned to the liquefier or liquefiers to facilitate the melting of the solid carbon dioxide therein, such vapor being liquefied in contact with the solid carbon dioxide and thus returned to the boiler.

The remainder of the vapor from the boiler, after passing through a suitable heat exchanger, is compressed to the desired pressure, cooled to remove the heat of compression, passed through a suitable filter to remove any traces of oil therefrom, returned through the heat exchanger and through a coil in the boiler where the vapor is liquefied by heat exchange with the liquid therein. The resulting liquid is then conveyed to a receiver from which it is withdrawn by a liquid pump which forces it through the filling line and into the cylinders in which it is transported.

Throughout the system, low pressures are maintained up to the point where the liquid is pumped into the cylinders. The pressures should be below 300 pounds per square inch gauge and preferably between 60 and 150 pounds per square inch gauge. Thus the liquefiers, the boiler, and the lines leading to the filter and thence to the receiver for the pure liquid carbon dioxide are not subjected to the high pressures heretofore considered necessary in the conversion of solid carbon dioxide to liquid. And, as previously indicated, because of the low pressures very little of the oil is carried over from the boiler with the carbon dioxide vapor, and any remnant of the oil, including oil which may be introduced by an oil lubricated compressor, is removed by the filter. Hence a substantially pure liquid carbon dioxide is assured in the cylinders.

The liquefiers may be constructed of any suitable material such as steel, and designed to withstand pressures of 200 pounds per square inch gauge with the usual safety factor. The pressure indicated is merely indicative of the preferred pressure limit for the liquefiers, as higher pressures can of course be used. The boiler is similarly constructed and designed to meet the requirements of the selected low pressure, that is to say a pressure below 300 pounds per square inch gauge. The vapor may be compressed in a suitable compressor, likewise designed to increase the pressure of the vapor to not to exceed 300 pounds per square inch gauge, and preferably to approximately 150 pounds per square inch gauge. The liquefiers and boiler may be operated at any low pressure above the triple point pressure to ensure the maintenance of the liquid phase.

As the vapor passes from the boiler, it enters an exchanger and gives up some of its cold to the returning compressed vapor. After compression, the heat of compression is removed in a cooler supplied with a suitable cooling medium such as water. The filter may be of any suitable type. I have found that a simple filter filled with cotton or other similar material to separate any entrained oil particles will adequately serve the purpose. The oil-free vapor then returns through the exchanger hereinbefore mentioned, wherein it is cooled, and enters the coil in the boiler where by heat exchange with the liquid contents of the boiler it is liquefied and passes thence to the receiver under the pressure to which the vapor has been raised by the compressor. The only heat required in the system is the amount of steam equivalent to the latent heat of liquefaction of the solid carbon dioxide in the liquefiers, but the steam, as will be noted, is applied to the boiler rather than to the liquefiers.

In order that the invention may be more clearly understood, reference is made to the accompanying drawing. The temperatures and pressures and other details hereinafter mentioned are merely illustrative of the preferred embodiment of the invention in its practical application to commercial production of liquid carbon dioxide. Other pressures and temperatures may be used so long as the fundamental purpose is maintained, that is the withdrawal of carbon dioxide vapor at relatively low pressure, filtration of the vapor at low pressure and condensation of the vapor to liquid while the vapor is still at low pressure by heat exchange with liquid carbon dioxide. The operation as thus carried out is economical both with respect to the installation and maintenance of the apparatus and the power consumed in the operation. It ensures the production of liquid carbon dioxide which is free from oil contamination.

Referring to the drawing, 5 and 6 indicate liquefiers of suitable construction, the details of which form no part of the present invention. The liquefiers are provided with liquid outlet pipes 7 and 8 connected to the liquid line 9 which delivers the liquid to a boiler 10 having a steam jacket 11 of suitable dimensions to permit application of the required amount of heat to vaporize the liquid in the boiler. From the boiler the vapor escapes through a pipe 12 having connections 13 and 14 to pipes 15 and 16 which deliver vapor to the liquefiers 5 and 6. Valves 17 and 18 permit the control of the vapor as desired, it being understood that when two liquefiers are used they will be filled with solid carbon dioxide alternately and vapor will be directed into the liquefier in which the solid carbon dioxide is being converted to liquid to facilitate melting of the solid. Connections 19 and 20 with valves 21 and 22 permit return of vapor from the liquefiers to the vapor line 12 during the final stage of the operation of each liquefier when only vapor remains therein. This permits pumping down the liquefier and avoids blow-down loss of carbon dioxide.

The vapor line 12 delivers the vapor to the exchanger 23 where it loses a part of its cold and is withdrawn through a pipe 24 and delivered to a compressor 25 which increases the pressure of the vapor to the desired point. A pipe 26 delivers the compressed vapor to an oil separator 27 having a baffle 28 which serves to separate some of the oil which may be introduced by an oil lubricated compressor. Thence the vapor travels through a pipe 29 in a cooler 30 which may be supplied with any suitable cooling medium such as water introduced through a pipe 31 and withdrawn through a pipe 32. The vapor passes through a pipe 33 to a filter 34 filled with cotton or other suitable material to remove the last traces of any oil present in the vapor. Thence it travels through a pipe 35 extending through the exchanger 23 to a coil 36 disposed within the boiler 10. At this point, the oil-free vapor is condensed by heat exchange with the liquid in the boiler. It is withdrawn through a pipe 37 and delivered to a receiver 38 for the storage of liquid. A return vapor line 39 permits the delivery of any vapor formed in the receiver to the boiler 10, so that loss of carbon dioxide is avoided.

The liquid is withdrawn from the receiver 38 through a pipe 40 and delivered through a strainer 41 to a liquid pump 42 which increases the pressure of the liquid to the point required for the filling of the cylinders. The compressed liquid passes through a pipe 43 to the filling manifold (not shown) from which it is delivered to the cylinders. A return liquid line 44 may be connected to the pipe 43 so that liquid may be circulated to the receiver during the periods when the filling manifold is not in operation.

In the operation of the apparatus, it is necessary first to obtain a supply of liquid sufficient to bring the liquid to the proper level in the boiler 10. The liquid may be introduced from any source, but preferably it is produced in the liquefiers which may be filled initially with solid carbon dioxide. The latter when liquefied will afford a sufficient supply of liquid to commence operation. Thereafter the liquefiers are preferably filled alternately, that is to say, one liquefier is filled with solid carbon dioxide and vapor from the boiler is delivered thereto to facilitate melting of the solid until the available solid carbon dioxide therein is substantially melted, whereupon the second liquefier is filled with solid and held in reserve to supply liquid when the first liquefier has been exhausted. Obviously, any number of liquefiers may be employed, and the particular sequence of operation is of no importance so long as sufficient liquid is maintained in the boiler. Steam is supplied to the boiler and the liquid therein is vaporized, a portion of the vapor being returned to the liquefier wherein the solid is undergoing liquefaction. The balance of the vapor is conveyed through the system as hereinbefore described, returning to the coil in the boiler to assist in the vaporization of the liquid therein and being thereby condensed to liquid which is free from oil impurities. This liquid is delivered to the receiver and is thence charged to the cylinders under the desired pressure.

The temperature in the liquefiers and boiler may be approximately —70° F. The pressure in the liquefiers during the melting of the solid therein may be preferably between 60 and 150 pounds per square inch gauge, and a similar pressure may be maintained in the boiler with a corresponding temperature. In passing through the exchanger 23, the temperature of the vapor is raised to approximately 68° F. After compression, the vapor is at approximately 167° F., and is cooled in the cooler 30 to approximately 86° F. At the latter temperature and at a pressure of approximately 150 pounds per square inch gauge, the vapor passes through the filter 34 which removes the oil. Thereafter the vapor, in passing through the exchanger 23, is reduced in temperature to approximately —33° F. and is delivered to the coil 36 in the boiler 10. The vapor is readily condensed and is delivered to the receiver at a temperature of approximately —43° F.

As will be readily understood, many of the details such as pressure gauges, sight gauges, pressure relief valves, drain pipes and other valves which are common in this type of apparatus are not illustrated and described, since they form no part of the invention and would be applied and utilized in similar arrangements by anyone skilled in the art. The omission of such illustration and description is merely to simplify the specification and to clarify the invention and the essential features thereof.

The method and apparatus as described afford considerable economy, both in installation and maintenance, but are particularly effective in the large scale production of liquid carbon dioxide free from oil contamination. While the filter is a desirable adjunct of the apparatus, it need not be employed where very slight traces of oil are permissible. As hereinbefore indicated, the major portion of the oil present in the solid carbon dioxide is retained in the boiler from which it can be removed at intervals. Very little oil is transferred to the compressor, and if the latter is not lubricated with oil there is usually no necessity for the filter, which nevertheless may be employed as an additional precaution, since it is simple in structure and in operation.

Various changes may be made in the form and arrangement of the apparatus, as well as in the details of operation, without departing from the invention or sacrificing the advantages thereof.

I claim:

1. The method of converting solid carbon dioxide containing oil or other relatively high boiling impurities to a purified liquid which comprises liquefying the impure solid carbon dioxide at or above the triple point pressure, subjecting the vapor from the impure liquid to filtration at a pressure below 300 pounds per square inch gauge to remove oil therefrom and thereafter condensing the vapor in heat exchange relation with the impure liquid carbon dioxide.

2. The method which comprises collecting and heating a body of liquid carbon dioxide, subjecting vapor from the liquid carbon dioxide at a pressure below 300 pounds per square inch gauge to filtration to remove oil therefrom and thereafter condensing the vapor.

3. The method which comprises collecting and heating a body of liquid carbon dioxide, subjecting vapor from the liquid carbon dioxide at a pressure below 300 pounds per square inch gauge to filtration to remove oil therefrom and thereafter conducting the vapor in heat exchange relation with liquid carbon dioxide, thereby condensing the vapor.

4. The method which comprises collecting and heating a body of liquid carbon dioxide, subjecting vapor from the liquid carbon dioxide at a pressure above 60 and below 300 pounds per square inch gauge to filtration to remove oil therefrom and thereafter condensing the vapor.

5. The method which comprises collecting and heating a body of liquid carbon dioxide, subjecting vapor from the liquid carbon dioxide at a pressure between 60 and 150 pounds per square inch gauge to filtration to remove oil therefrom and thereafter condensing the vapor.

6. The method which comprises collecting and heating a body of liquid carbon dioxide, subjecting vapor from the liquid carbon dioxide at a pressure above 60 and below 300 pounds per square inch gauge to filtration to remove oil therefrom and thereafter conducting the vapor in heat exchange relation with liquid carbon dioxide, thereby condensing the vapor.

7. The method which comprises collecting and heating a body of liquid carbon dioxide, subjecting vapor from the liquid carbon dioxide at a pressure between 60 and 150 pounds per square inch gauge to filtration to remove oil therefrom and thereafter conducting the vapor in heat exchange relation with liquid carbon dioxide, thereby condensing the vapor.

8. The method which comprises collecting and heating a body of liquid carbon dioxide, withdrawing and compressing vapor therefrom, filtering the vapor to remove oil therefrom and conducting the vapor in heat exchange relation with liquid carbon dioxide, thereby condensing the vapor.

9. The method which comprises collecting and heating a body of liquid carbon dioxide, withdrawing and compressing vapor therefrom to a pressure below 300 pounds per square inch gauge, filtering the vapor at that pressure to remove oil therefrom and conducting the vapor in heat exchange relation with liquid carbon dioxide, thereby condensing the vapor.

10. The method which comprises collecting and heating a body of liquid carbon dioxide, withdrawing and compressing vapor therefrom to a pressure between 60 and 150 pounds per square inch gauge, filtering the vapor at that pressure to remove oil therefrom and conducting the vapor in heat exchange relation with liquid carbon dioxide, thereby condensing the vapor.

11. The method of converting solid carbon dioxide containing oil or other relatively high boiling impurities to a purified liquid which comprises liquefying the impure solid carbon dioxide at or above its triple point pressure to produce a body of impure liquid carbon dioxide, withdrawing impure liquid carbon dioxide from said body, vaporizing the withdrawn impure liquid carbon dioxide, compressing at least a portion of the resulting vapor, and thereafter condensing the compressed vapor by heat exchange with the impure liquid.

12. The method of converting solid carbon dioxide to the liquid phase which comprises liquefying the solid carbon dioxide to produce a body of liquid carbon dioxide, withdrawing liquid carbon dioxide from said body, vaporizing the withdrawn liquid carbon dioxide at or above its triple point pressure, compressing at least a portion of the resulting vapor, and reliquefying the compressed vapor by heat exchange with the vaporizing liquid.

13. The method of converting solid carbon dioxide to the liquid phase which comprises liquefying the solid carbon dioxide to produce a body of liquid carbon dioxide, withdrawing liquid carbon dioxide from said body, vaporizing the withdrawn liquid carbon dioxide at or above its triple point pressure, compressing at least a portion of the resulting vapor, filtering the compressed vapor, and reliquefying the compressed vapor by heat exchange with the vaporizing liquid.

14. The method of converting solid carbon dioxide to the liquid phase which comprises liquefying the solid carbon dioxide to produce a body of liquid carbon dioxide, withdrawing liquid carbon dioxide from said body, vaporizing the withdrawn liquid carbon dioxide at or above its triple point pressure, returning a portion of the resulting vapor to contact with the solid carbon dioxide, compressing the remainder of the resulting vapor, and reliquefying the compressed vapor by heat exchange with the vaporizing liquid.

15. The method of converting solid carbon dioxide to the liquid phase which comprises liquefying the solid carbon dioxide to produce a body of liquid carbon dioxide, withdrawing liquid carbon dioxide from said body, vaporizing the withdrawn liquid carbon dioxide at or above its triple point pressure, returning a portion of the resulting vapor to contact with the solid carbon dioxide, compressing the remainder of the resulting vapor, filtering the compressed vapor, and reliquefying the compressed vapor by heat exchange with the vaporizing liquid.

WOLCOTT DENNIS.